T. E. COLBRUNN.
Gaged Butter-Cutters and Lifters.

No. 142,207. Patented August 26, 1873.

Witnesses.
Geo. W. Tibbitts
O. S. Crowl

Inventor.
Theodore E. Colbrunn

AM. PHOTO-LITHOGRAPHIC CO. N.Y. (OSBORNE'S PROCESS)

UNITED STATES PATENT OFFICE.

THEODORE E. COLBRUNN, OF CLEVELAND, OHIO.

IMPROVEMENT IN GAGED BUTTER CUTTERS AND LIFTERS.

Specification forming part of Letters Patent No. 142,207, dated August 26, 1873; application filed June 7, 1873.

*To all whom it may concern:*

Figure 1:
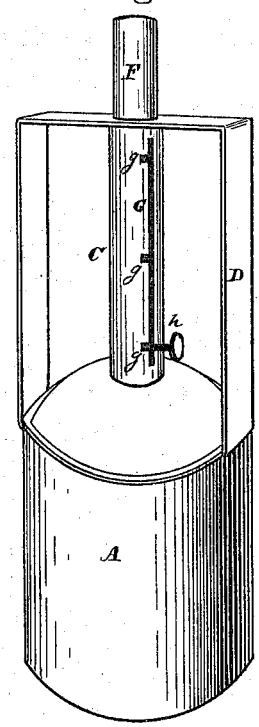
Figure 2:
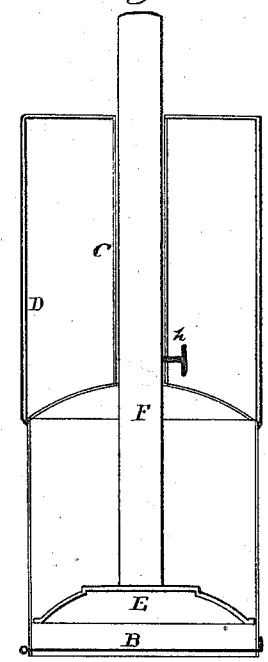
Figure 3:
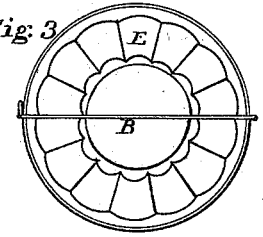

Be it known that I, THEODORE E. COLBRUNN, of Cleveland, Ohio, have invented a Gaged Butter-Lifter, of which the following is a specification:

In the accompanying drawing, Figure 1 is a perspective view of my butter-lifter. Fig. 2 is a vertical section. Fig. 3 is a bottom-end view.

The object of my invention is to rapidly cut and form butter into round cakes of given size and weight, and to lift them from a tub or firkin, and then depositing the said rolls or cakes in form on plates, or ready for use. The invention consists of a sheet-metal cylinder, A, open at the bottom, and having a fine wire, B, stretched across said open bottom. The top of said cylinder is closed by a cap or dome, and has a hollow handle, C, rising from the center and supported by a bail, D. In the cylinder A is a follower, E, attached to a rod, F, which plays in the hollow handle C. In the said handle C is a slot, G, having notches $g\ g$ at one side, and in said slot plays a pin, $h$, which is secured in the side of the rod F. The notches $g\ g$ are gage-marks for fixing the follower at different places in the cylinder, and which indicate the weight of the roll or quantity of butter under the follower.

The operation of this is as follows: The follower E is set with the pin $h$ in the middle notch $g$ of the handle C, which indicates, say, one pound. The cylinder is then forced down into the butter until it reaches the follower; then the operator gives the cylinder a half-turn round, which causes the wire B across the mouth of the cylinder to cut the butter contained in the cylinder from the main mass; then, by withdrawing the lifter from the mass in the tub, carries the butter in the cylinder with it; then, by turning the wire B to one side out of the way, the butter is pushed out by forcing down the follower, and the butter deposited on a plate in a neat round form, ready for the table.

The follower may have a design carved in its face, so as to leave a print on the top of the said roll.

The wire B, of course, cuts the butter into two halves when the cylinder is forced into the mass, but when the roll is forced out by the follower the two halves are closed together again, so that it remains in one complete round roll.

This is a useful and convenient device for dealers, dairies, restaurants, hotels, or families.

Having described my invention, I claim—

The cylinder A, wire cut-off B, hollow handle C, bail D, follower E, rod F, and gage G, when constructed, combined, and operating substantially as and for the purpose set forth.

THEODORE E. COLBRUNN.

Witnesses:
 EDWARD BELZ, Jr.,
 GEO. A. KOLBE.